No. 785,093. PATENTED MAR. 21, 1905.
W. C. FOX.
ARTIFICIAL STONE MOLD.
APPLICATION FILED JULY 18, 1904.
2 SHEETS—SHEET 1.
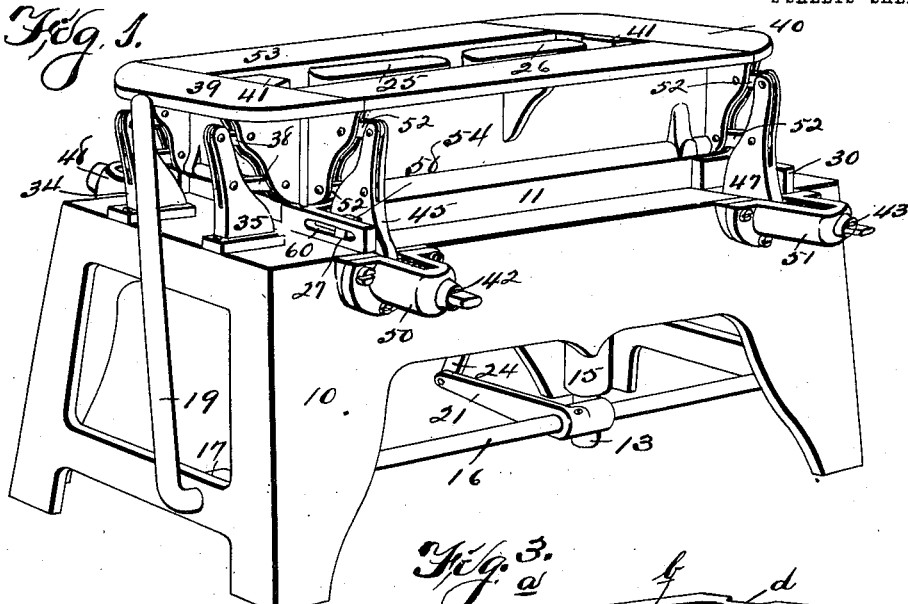
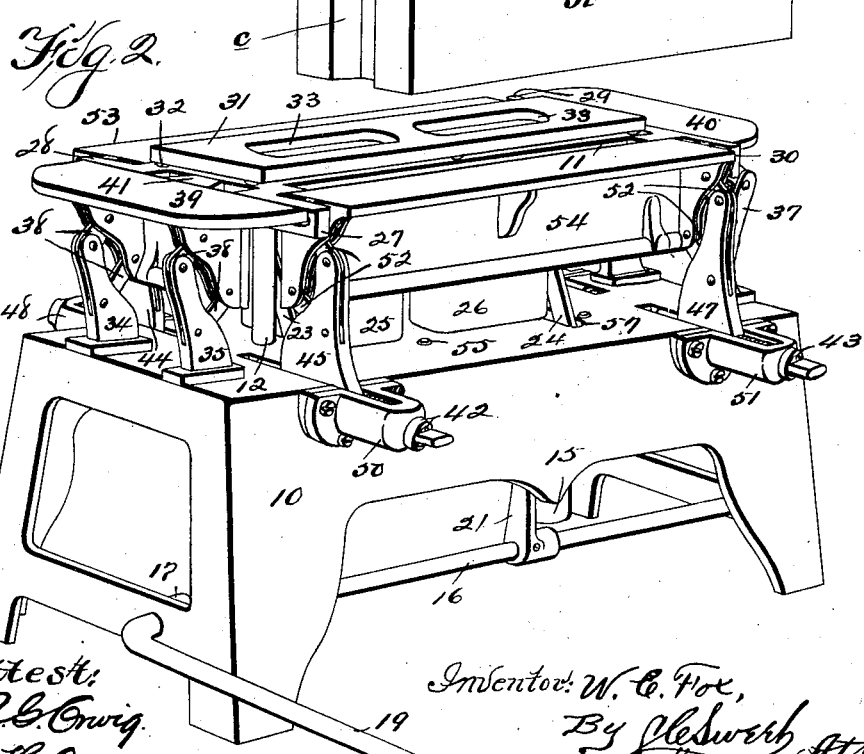
Attest:
R. G. Orwig.
L. H. Orwig.
Inventor: W. C. Fox,
By J. E. Swerb, Atty.

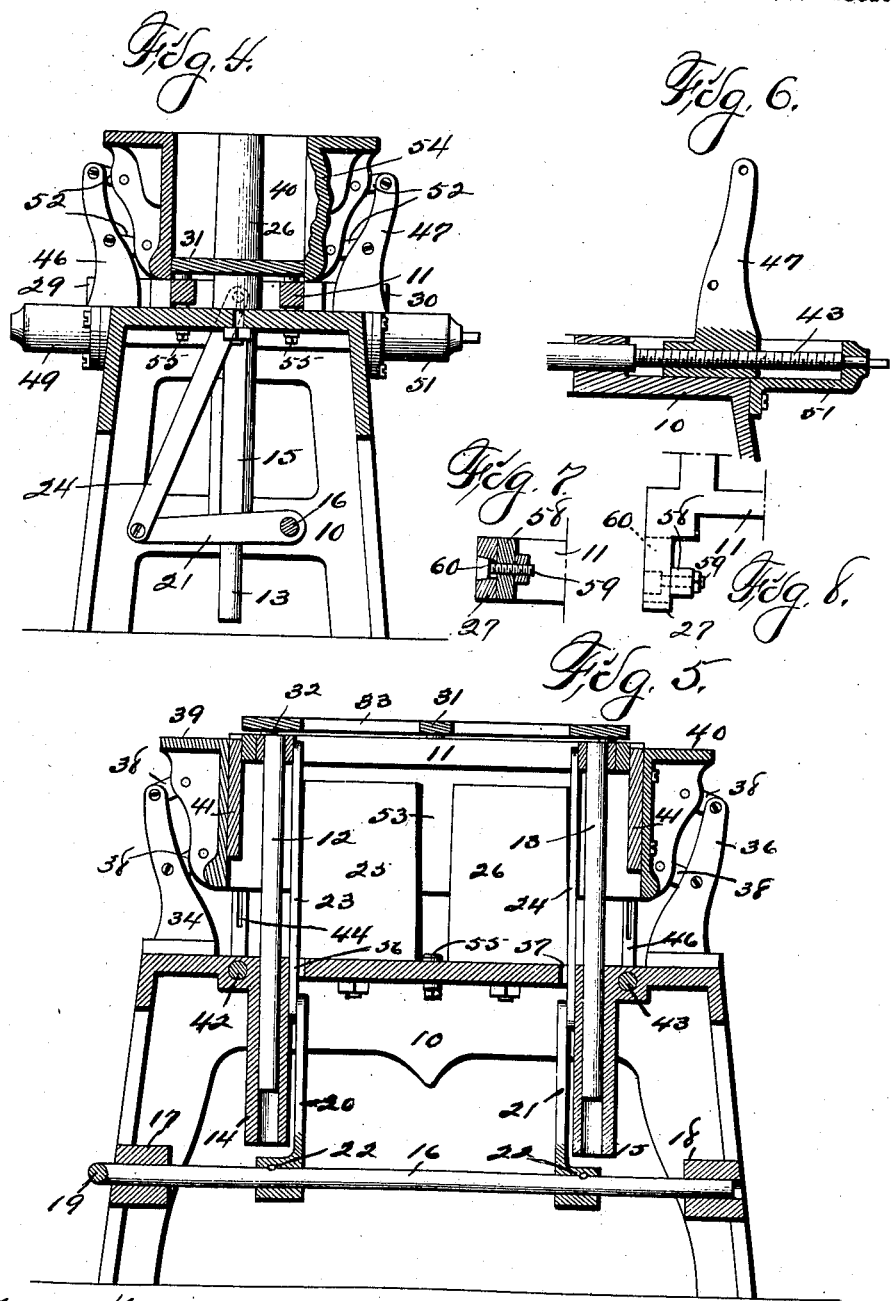

No. 785,093.        Patented March 21, 1905.

UNITED STATES PATENT OFFICE.

WILLIAM C. FOX, OF WATERLOO, IOWA, ASSIGNOR TO IOWA GASOLINE ENGINE COMPANY, OF WATERLOO, IOWA, A CORPORATION OF IOWA.

ARTIFICIAL-STONE MOLD.

SPECIFICATION forming part of Letters Patent No. 785,093, dated March 21, 1905.

Application filed July 18, 1904. Serial No. 217,144.

*To all whom it may concern:*

Be it known that I, WILLIAM C. FOX, a citizen of the United States of America, and a resident of Waterloo, Blackhawk county, Iowa, have invented a new and useful Artificial-Stone Mold, of which the following is a specification.

The object of this invention is to provide improved means for molding plastic material.

A further object of this invention is to provide means for forming cores in plastic material.

A further object of this invention is to provide means for molding plastic material, for forming cores in the molded plastic material, and delivering the molded material outside the mold.

A further object of this invention is to provide means for forming plane or configurated surfaces on molded plastic material and delivering the molded material from the mold.

A further object of this invention is to provide means for moving the sides of a mold laterally relative to material molded therein and then moving the molded material vertically outside the mold.

A further object of this invention is to provide means for moving the mold vertically relative to the cores of the molding-machine, then moving the sides of the mold laterally, and then moving the mold materially vertically outside the mold.

A further object of this invention is to provide means for locking the sides of a mold in either open or closed position.

A further object of this invention is to provide means for locking the bottom of a mold in either open or closed position.

A further object of this invention is to provide means for adjusting the transverse dimensions of a mold for plastic material.

A further object of this invention is to provide means for interchangeably using different side plates of molds for plastic material.

My invention consists in the construction, arrangement, and combination of elements hereinafter set forth, pointed out in my claims, and illustrated by the accompanying drawings, in which—

Figure 1 is a perspective illustrating my improved mold in closed position. Fig. 2 is a perspective illustrating my improved mold in open position. Fig. 3 is a perspective of a block molded in my improved machine. Fig. 4 is a vertical section transversely and centrally of the machine. Fig. 5 is a vertical section longitudinally and centrally of the machine. Fig. 6 is a detail view of an adjusting device employed in the machine. Figs. 7 and 8 are detail views of parts of the machine.

In the construction of the machine as shown the numeral 10 designates a bed or machine frame, preferably made of metal by molding, and of great strength. The bed or machine frame 10 may be of any desired construction; but I prefer to make it self-bracing in each direction by forming the base thereof of greater width and length than its top. A lifting-frame 11 of rectangular form is mounted loosely on the upper surface of the bed 10, and rods 12 13 are fixed at their upper ends to end portions of said lifting-frame and project downwardly through apertures in the bed 10 and through guiding-tubes 14 15, formed on and depending from said bed. The rods 12 13 fit snugly and slidingly engage with the guiding-tubes 14 15 and retain the lifting-frame 11 against lateral vibration. A rock-shaft 16 is journaled for oscillation in bearings 17 18, formed in end portions of the bed 10, and said rock-shaft is parallel with and below the upper surface of the bed. The rock-shaft 16 is provided with a lever-handle 19 on one end portion and arranged for manual actuation. Cranks 20 21 are mounted on the rock-shaft 16 intermediate of its ends and are secured thereto by keys 22. When the machine is in closed position, as illustrated in Fig. 1, the cranks 20 21 extend horizontally and the extremities thereof are pivotally connected by links 23 24 to end portions of the lifting-frame 11. The points of connection between the links 23 24 and the frame 11 are in alinement with the upper ends of the rods 12 13 longitudinal of said frame.

Core members 25 26 are fixed to and rise from the upper surface of the bed 10 and are employed to form core-holes or openings $a$ $b$ in the block A of material molded in the machine, as hereinafter described. The cores 25 26 may vary in shape, size, and location, but preferably taper from their lower ends upwardly to facilitate withdrawal or removal of the molded block therefrom.

Guide-arms 27 28 29 30 are formed on, offset longitudinally of, and extend laterally from corners of the lifting-frame 11. A carrying-plate 31 is provided and formed with lugs 32, one at each corner and one at the center of each long side, which lugs serve as feet to support said plate on the lifting-frame. The carrying-plate 31 also is formed with openings 33, corresponding in number and size with the cores 25 26 employed in the machine and arranged for the reception of said cores.

Brackets 34 35 36 37 are mounted on and rise from end portions of the bed 10. The brackets 34 35 36 37 may be adjusted longitudinally of the bed by removal and repositioning of the bolts employed to secure said brackets in place; but ordinarily said brackets are not to be adjusted, the machine being constructed and erected to mold a block of given and definite length and another machine being provided for the molding of a block of a different length. Each of the brackets 34 35 36 37 is bifurcated, and a pair of links 38 is mounted one above the other in and pivoted at one end to the bifurcated portion thereof. The links project inwardly from the brackets. The links 38, that are pivoted at their outer ends to the brackets 34 35, are pivoted at their inner ends to an end plate 39, and the links that are pivoted at their outer ends to the brackets 36 37 are pivoted at their inner ends to an end plate 40. The inner faces of the end plates 39 40 are parallel with each other on vertical lines and trend alike on transverse lines, and the employment of pairs of links to connect said end plates to the respective brackets insures the maintenance of such parallel relations during vertical movement of said plates.

A core 41 is mounted on the central portion of the inner surface of each of the end plates 39 40 in alinement with the cores 25 26 longitudinally of the machine. The core-prints 41 are provided to form notches c d in end portions of the block A, molded in the machine, and may be removed and substituted by others of different shape or size, as desired, but preferably are tapering from their lower ends upwardly to facilitate the removal of the molded block therefrom and taper from their outer surfaces inwardly for the same reason.

Shafts 42 43 are mounted loosely in and transversely of end portions of the bed 10 and near the upper surface thereof. The shafts 42 43 are oppositely threaded on opposite end portions, and brackets 44 45 46 47 are provided with interiorly-threaded hubs mounted on the threaded end portions of the shafts. The shafts 42 43 are confined against longitudinal movement by caps 48 49 on their rear ends and caps 50 51 on their forward ends, said caps being bolted to the outer faces of the bed 10. The forward end portions of the shafts 42 43 extend through the caps 50 51 and are made angular for the reception of a wrench, whereby said shafts may be rotated manually and in such rotation adjust the distances of separation between the brackets carried thereby. The brackets 44 45 46 47 rise through slots in the bed 10 and are bifurcated, and links 52 are pivoted in pairs at their outer ends on said brackets. The inner end portions of the links 52 are pivoted in pairs to side plates 53 54 of the mold. The inner faces of the side plates 53 54 are approximately parallel with each other on vertical and horizontal lines, and the employment of links 52 in pairs at each end of each side plate and connected to the brackets at their outer ends insures the maintenance of such parallel relations during upward movements thereof. One or the other, or both, of the side plates 53 54 may be configurated, as illustrated in section in Fig. 4, to give the desired face to the block A being molded in the machine. I have illustrated the plate 54 only configurated in the form usually employed by me to give the finished block the appearance of stone.

It will be observed that when the machine is in closed position, as shown in Figs. 1 and 4, the points of pivotal connection between the links 38 52 and the end and side plates, respectively, are in a lower horizontal plane than the pivotal points between said links and the brackets supporting them and that said end and side plates embrace and contact with the end and side margins of the carrying-plate 31, the end plates also embracing and contacting with end portions of the side plates, thus providing an inclosure for five sides of a parallelogram, the upper side only thereof being open. The placing of the inner pivotal points in a horizontal plane below the outer pivotal points of the links insures the close and proper contacting relations between the end and side plates and between said plates and the carrying-plate during the operation of tamping plastic material in the molding-space inclosed thereby, since said end and side plates must rise before they can move outwardly relative to the carrying-plate, and such rising is prevented by the peculiar respective positionings of the pivotal points.

It will be observed that adjusting-screws 55 are mounted in and project upwardly through the bed and serve to support the lifting-frame in its lowermost position, said adjusting-screws being provided to level the lifting-frame irrespective of any uneven surface of the bed.

In practical use the machine is positioned as shown in Figs. 1 and 4, with the desired cores mounted in proper positions, and plastic material is placed in the space inclosed by the end and side plates and tamped therein, if desired. The handle-lever 19 is then manipulated into the position shown in Figs. 2 and 5, and the first effect of moving said handle-lever to the right is to lift the lifting-frame, carrying-plate, end plates, side plates, and cores 41 a slight distance—sufficient to loosen the block being molded from the cores 25 26 and raise the inner pivotal points of the links 38 52 to the same horizontal plane as the outer pivotal points thereof. In the further movement of the handle-lever 19 to the right the end plates and side plates are carried higher by the guide-arms 27 28 29 30 and while so carried are caused to move outward by the links 38 52 until they are released from the lifting force of the guide-arms. The outward movement of the end plates and side plates while resting on the guide-arms is uniform in all directions and causes said end plates and side plates to detach and separate from the block being molded a material and considerable distance—sufficient to entirely release the cores 41 from the notches $c$ $d$ of the block and to release and separate the configurated faces, if any, of the side plates from the side faces of the block. Further movement of the handle-lever 19 to the right causes the guide-arms to rise between the end plates and side plates and lock said plates in their utmost limit of outward movement. Further movement of the handle-lever 19 to the right raises the lifting-plate and carrying-plate between the cores 41 until said lifting-plate is slightly above the upper margins of the end plates and side plates, whereupon the outer extremities of the cranks 20 21 pass to the right beneath the upper pivotal points of the links 23 24 and bring said links into contact with the bed at the right ends of slots 56 57 in the bed. Since the cranks 20 21 pass the dead-centers and bring the links into contact with the ends of the slots of the bed, it follows that the lifting-frame will descend slightly and rest supported by said links until such time as the handle-lever is lifted sufficiently to overcome the dead-centers in the opposite direction. When the lifting-frame has reached a position of rest in the open position of the mold, the block A is supported by the carrying-plate 31 entirely free from the cores 25 26, and said block may be lifted with the carrying-plate and set aside thereon to "set." Another carrying-plate is then placed on the lifting-frame, and the handle-lever is repositioned, as shown in Figs. 1 and 4, and such movement of the handle-lever effects a reverse oscillation of the rock-shaft 16, swings the cranks 20 21 downward, and permits the descent of the lifting-frame and carrying-plate under control of the links 23 24 and guided by the rods 12 13. When the lifting-frame has nearly reached its lowermost limit of movement, the guide-arms release the end plates and side plates of the mold and permit them to fall by gravity into contacting positions, as initially shown, the carrying-plate being received beneath the lower ends of the cores 41 and locked by said cores in desired position, the lower margins of the end plates and side plates resting on and holding down the guide-arms.

Blocks of a different thickness may be molded in this machine by adjusting the side plates 53 54 nearer to or farther from each other through manipulation of the shaft 42 43, and in such event a carrying-plate of different size would be employed and substituted for those shown and heretofore described. When the side plates 53 54 are adjusted at greater distances of separation, they are supported on lugs 53, adjustably mounted on the arms 27 28 29 30 by means of bolts 59, mounted through said lugs and having their heads in beveled slots 60 in said arms, and it may be found desirable to substitute longer end plates for those shown and heretofore described to maintain the perfect configuration of the space inclosed by said plates.

Either of the side plates or end plates may be removed and substituted by another of different interior face or configuration.

I claim as my invention—

1. The combination of a bed, cores mounted thereon, a lifting-frame normally resting on said bed and surrounding said cores, guide-arms on said lifting-frame, lever mechanism whereby said frame may be lifted, end plates and side plates of a mold normally resting on said guide-arms of the lifting-frame and pivotally supported from the bed, and means whereby the lifting of the frame raises the end plates and side plates through arcs.

2. In a machine of the class described, mold members, parallel links sustaining said mold members, the inner ends of said links being normally below the outer ends thereof whereby the mold members normally are locked against separation by lateral movements, and means for lifting said mold members and then moving them through arcs.

3. In a machine of the class described, mold members, parallel links sustaining said mold members pivotally, the inner ends of said links being normally below the outer ends thereof whereby the mold members normally are locked against separation by lateral movements, a lifting-frame, guide-arms on said lifting-frame and adapted to support said mold members normally, and means for lifting said frame whereby said mold members are lifted and then moved through arcs.

4. In a machine of the class described, a mold comprising side plates and end plates, parallel links arranged in pairs and pivotally supporting said side plates and end plates, the inner ends of said links being normally below the outer ends thereof whereby the mold members normally are locked against separation by lateral movements, the links supporting the side plates being adjustable inward and outward to vary the distances of separation of said side plates, and means for lifting said side plates and end plates and then moving them through arcs.

5. In a machine of the class described, a bed, a rock-shaft in said bed, cranks on said rock-shaft, links rising from said cranks through said bed, a lifting-plate carried by said links, guide-arms on said lifting-plate, end plates and side plates pivotally supported from said bed and normally resting on said guide-arms, and a carrying-plate normally resting on said lifting-plate.

6. In a machine of the class described, a bed, guide-bearings on said bed, rods slidingly mounted in said bearings, a lifting-plate fixed to said rods, mold members normally resting on said lifting-plate and pivotally carried by said bed, and means for lifting said plate and mold members.

7. The combination of a bed, mold members pivotally supported from said bed independent of each other, cores rigidly mounted on said bed and non-movable, said cores surrounded by said mold members, a lifting-frame on said bed and supporting said mold members supplementary to the pivotal connection thereof with the bed, and a lever mechanism engaging said lifting-frame, whereby when the frame is lifted the mold members may be moved conjunctively through arcs.

8. In a machine of the class described, mold members, parallel links pivotally sustaining said mold members, the inner ends of said links being normally below the outer ends thereof, rigidly-mounted cores surrounded by said mold members and non-movable, a lifting-frame carrying said mold members supplementary to the pivotal support thereof by the links, and a single lever mechanism for lifting said frame and mold members conjunctively, and then moving said mold members through arcs.

Signed by me at Waterloo, Iowa, this 14th day of May, 1904.

WILLIAM C. FOX.

Witnesses:
 CHRISTIAN SORENSEN,
 JAMES E. BRIDEN.